United States Patent
Botros

(10) Patent No.: US 8,377,562 B2
(45) Date of Patent: Feb. 19, 2013

(54) MULTILAYER STRUCTURES WITH COMMON TIE LAYER

(75) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 530 days.

(21) Appl. No.: 12/655,434

(22) Filed: Dec. 30, 2009

(65) Prior Publication Data

US 2011/0159297 A1 Jun. 30, 2011

(51) Int. Cl.
*B32B 27/00* (2006.01)

(52) U.S. Cl. ............................ 428/500; 428/515; 525/71

(58) Field of Classification Search .................. 428/500, 428/515; 525/71
See application file for complete search history.

(56) References Cited

U.S. PATENT DOCUMENTS

| 5,591,792 A * | 1/1997 | Hattori et al. ................. 524/271 |
| 6,184,298 B1 * | 2/2001 | Lee ............................... 525/240 |
| 2007/0167569 A1 | 7/2007 | Botros |
| 2009/0171022 A1 | 7/2009 | Botros |

* cited by examiner

*Primary Examiner* — Leszek Kiliman

(57) ABSTRACT

Multilayer structures having layers of a styrene polymer, polyethylene, propylene polymer, and common tie layers of a styrene-butadiene-styrene triblock copolymer-containing adhesive.

15 Claims, No Drawings

MULTILAYER STRUCTURES WITH COMMON TIE LAYER

FIELD OF THE INVENTION

The invention relates to multilayer structures having a common tie layer. More particularly, the invention relates to multilayer structures having layers of a styrene polymer, polyethylene, propylene polymer, and SBS-containing tie layers.

BACKGROUND OF THE INVENTION

In multilayer packaging, various layers are often combined to provide a final product that has the characteristics of the separate layers. For example, structures that include different types of polyethylene, polypropylene, and ethylene vinyl acetate together with barrier layers such as ethylene vinyl alcohol (EVOH) and polyamide (PA) are often used in food packaging applications for meat and cheese. In such multilayer constructions, polypropylene typically provides stiffness, temperature resistance and scuff resistance. Polyethylene typically provides clarity and tear resistance, seals at a lower temperature and is softer than polypropylene. Styrene polymers can be included in such structures to provide structural integrity. Although it is possible to use a blend of polypropylene and polyethylene in a single layer, in conjunction with barrier and styrene polymer layers, the blend layer will not provide the full performance of a structure containing separate layers of polypropylene and polyethylene. However, a challenge presented by the design of multilayer structures is adhering the separate layers. This is particularly the case for structures containing both polypropylene and polyethylene layers, and also styrene polymer layers in thermoforming applications. It is desirable to utilize a single tie layer in a multilayer structure, otherwise in a commercial setting, capital investment would thus be required for multiple extruders, and additional extrusion steps translate to higher operating costs.

U.S. Pat. Publ. 2007/0167569 discloses adhesives containing styrene-isoprene-styrene polymers in multilayer structures containing styrene polymer layers. U.S. Pat Publ. 2009/0171022 discloses adhesives containing styrene-isoprene-styrene/styrene-butadiene-styrene polymer blends in multilayer structures containing styrene polymer layers. U.S. Pat. No. 6,184,298 discloses adhesives containing unmodified styrene-based elastomers in multilayer structures containing polyethylene and polypropylene. However, a continuing need exists for multilayer structures containing layers of polyethylene, propylene polymers, and styrene polymers, having a common tie layer with the capability of adhering all layers in the structure.

SUMMARY OF THE INVENTION

The present invention relates to a multilayer structure comprising a propylene polymer layer; a styrene polymer layer; a polyethyelene layer; and tie layers comprising 25 to 75 wt % of an ethylene-$C_{4-8}$ α-olefin linear low density copolymer; 5 to 25 wt % of a polyethylene resin grafted with an ethylenically unsaturated carboxylic acid or acid derivative; and 20 to 50 wt % of a styrene-butadiene-styrene triblock copolymer having an MI of 18 to 35 dg/min. The tie layers are the same and are positioned between adjacent layers of the multilayer structure.

DETAILED DESCRIPTION OF THE INVENTION

It has unexpectedly been found that multilayer structures of a styrene polymer layer, propylene polymer layer, and polyethylene layer demonstrate good adhesion using a common tie layer containing a styrene-butadiene-styrene triblock copolymer bonding the adjacent layers. The multilayer structures of the invention provide advantages in packaging applications by minimizing equipment and operating costs through the use of a single extrusion step.

Propylene Polymer Layer

The propylene polymer layer (PP) preferably includes a layer selected from a homopolymer of propylene, a copolymer of propylene with ethylene or $C_4$-$C_{10}$ alpha-olefins where the ethylene or $C_4$-$C_{10}$ alpha-olefin comonomers are present in amounts up to 10 wt % or mixtures thereof. The propylene homopolymers and copolymers can be produced using either Ziegler Natta or single-site catalysts, e.g., metallocene catalysts. When the propylene polymer is a copolymer, it preferably contains 2 to 6 wt % ethylene as a comonomer. More preferably, the propylene polymer layer is a propylene homopolymer.

Polyethylene Layer

The polyethylene layer (PE) is selected from ethylene homopolymers, ethylene copolymers where the comonomer is chosen from $C_{4-8}$ α-olefins, or mixtures thereof. The polyethylene layer can also include co-extruded structures of polyethylene with other ethylene copolymers such as ethylene-vinyl acetate copolymer and ethylene methyl acrylate copolymer. Ethylene homopolymers and ethylene-$C_{4-8}$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D 792. LDPE and LLDPE are defined as having densities in the range 0.910 to 0.930 g/cm$^3$. MDPE is defined as having a density of 0.930 to 0.945 g/cm$^3$. HDPE is defined as having a density of at least 0.945 g/cm$^3$, preferably from 0.945 to 0.969 g/cm$^3$. The ethylene homopolymers and copolymers preferably have melt indexes (MIs), as measured by ASTM D 1238, condition 190/2.16, from 0.01 to 400 dg/min, preferably, from 0.1 to 200 dg/min., more preferably from 1 to 100 dg/min. Preferably, the polyethylene layer is LDPE.

Styrene Polymer Layer

The styrene polymer layer can be polystyrene (PS), high impact polystyrene (HIPS) or a blend of HIPS and polystyrene (PS+HIPS) where the HIPS contains up to about 30 wt %, preferably between about 8 and about 15 wt % elastomer. Suitable elastomers for use as impact modifiers for HIPS resins include natural rubber and synthetic rubbers, such as styrene-butadiene rubber, acrylonitrile-butadiene rubber, butyl rubber, chloroprene rubber, silicone rubber, acryl rubber, urethane rubber, polybutadiene rubber, ethylene propylene rubber, etc. In high impact polystyrene resin compositions, the elastomer exists as a dispersed phase in the styrene polymer. In the co-extruded structures of polyethylene and EVA, the types of polyethylene are as described above. Preferably, the styrene polymer layer is PS+HIPS.

Tie Layer

The tie layer comprises a styrene-butadiene-styrene triblock copolymer (SBS), a polyethylene resin grafted with an ethylenically unsaturated carboxylic acid or acid derivative, and an ethylene-$C_{4-8}$ α-olefin linear low density copolymer.

SBS triblock copolymers useful for the invention are commercially available thermoplastic elastomers which preferably contain from 25 to about 60 wt % styrene. More preferably, the SBS triblock copolymers contain 30 to 55 wt % styrene. Most preferably, the SBS triblock copolymers contain 40 to 50 wt % styrene. MIs of the SBS copolymers are from 18 to 35 dg/min, determined in accordance with ASTM D 1238 (200° C.; 5 kg). Preferably, the MIs are in the range from 20 to 30 dg/min, more preferably from 20 to 24 dg/min.

The grafted polyethylene resin is obtained by reacting unsaturated carboxylic acids and carboxylic acid anhydrides, or derivatives thereof, with polyethylene under grafting conditions. The grafting monomers, i.e., acid, anhydride or derivative, are incorporated along the polyethylene or polypropylene backbone. The polyethylene to be grafted includes ethylene homopolymers and copolymers of ethylene with propylene, butene, 4-methyl pentene, hexene, octene, or mixtures thereof. Preferably, the polyethylene to be grafted is HDPE or LLDPE. Most preferably, the polyethylene to be grafted is HDPE.

Carboxylic acids or anhydrides useful as grafting monomers include compounds such as acrylic acid, maleic acid, fumaric acid, citaconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo (2.2.1)hept-5-ene-2,3-dicarboxylic acid or anhydride, tetrahydrophthalic acid or anhydride, x-methylbicyclo(2.2.1) hept-5-ene-2,3-dicarboxylic acid or anhydride, nadic anhydride, methyl nadic anhydride, himic anhydride, and methyl himic anhydride. Maleic anhydride is a particularly useful grafting monomer. Acid and anhydride derivatives which can be used to graft the polyethylene or polypropylene include dialkyl maleates, dialkyl fumarates, dialkyl itaconates, dialkyl mesaconates, dialkyl citraconates and alkyl crotonates.

Grafting is accomplished by thermal and/or mechanical means in accordance with known procedures, with or without a free-radical generating catalyst such as an organic peroxide, where the grafted sample is prepared by heating a mixture of the polyolefin and graft monomer(s), with or without a solvent, while subjecting it to high shear. Preferably, the grafted products are prepared by melt blending the polyethylene or polypropylene in the substantial absence of a solvent, in the presence of the grafting monomer in a shear-imparting reactor, such as an extruder. Twin screw extruders such as those marketed by Werner-Pfleiderer under the designations ZSK-30, ZSK-53, ZSK-83, ZSK-90 and ZSK-92 are especially useful for carrying out the grafting operation. Preferably, the amount of acid or acid derivative comonomer(s) grafted onto the polyethylene or polypropylene ranges from 0.1 to 4 weight percent, preferably from 0.5 to 3.0 weight percent. Preferably, when maleic anhydride is grafted onto HDPE or LLDPE, the grafted maleic anhydride concentration is 0.5 to 4 weight percent. Melt indexes (MIs) of the modified ethylene polymers as measured by ASTM D 1238, at 190° C., 2.16 kg, are preferably 1 to 20 dg/min.

The grafting reaction is carried out at a temperature selected to minimize or avoid rapid vaporization and consequent losses of the graft monomer and any catalyst that may be employed. The graft monomer concentration in the reactor is typically about 1 to about 5 wt. % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. The grafting monomer and any catalyst used are preferably added in neat form to the extruder/reactor.

The ethylene-$C_{4-8}$ α-olefin linear low density copolymer used in the tie layer composition is as described above for the ethylene polymer layer. Preferably, the ethylene-$C_{4-8}$ α-olefin linear low density copolymer is an ethylene-butene-1 linear low density copolymer The tie layer compositions can further comprise additives such as stabilizers, UV absorbers, metal deactivators, thio-synergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof, which can be added in amounts well known to those skilled in the art.

The tie layer contains 25 to 75 wt %, preferably 45 to 67 wt % of the ethylene-$C_{4-8}$ α-olefin linear low density copolymer; 5 to 25 wt %, preferably 8 to 15 wt % of the polyethylene resin grafted with an ethylenically unsaturated carboxylic acid or acid derivative; and 20 to 50 wt %, preferably 25 to 40 wt % of the styrene-butadiene-styrene triblock copolymer.

The multilayer structures preferably contain barrier layers.

Barrier Layers

Barrier layers in the multilayer structures include ethylene vinyl alcohol copolymer (EVOH), polyamides such as nylon 6, nylon 6,6, nylon 12, nylon 6,12, nylon 6,66 and blends thereof, as well as co-extruded structures of EVOH and polyamides, such as EVOH/polyamide and polyamide/EVOH/polyamide, Barrier layers also include polyvinylidene chloride (PVDC) and polychlorotrifluoroethylene (PCTFE). Preferably, the barrier layers are selected from EVOH, polyamides or co-extruded structures thereof. More preferably, the barrier layer is EVOH.

The multilayer structures can include films or sheets, which may be further thermoformed or oriented, and can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

Tie layers are used to bond adjacent layers of the barrier, propylene polymer, styrene polymer and polyethylene layers. Each of the tie layers present in the multilayer structure is the same.

The propylene polymer layer, styrene polymer layer, polyethylene layer, and when present, the barrier layer, may be positioned relative to one another in any way required for the demands of a particular application. Preferably, the multilayer structure contains a barrier layer.

The multilayer structures may also include additional layers of propylene polymer, polyethylene, styrene polymers, barrier layers, polyamides or metal layers, provided that when a tie-layer is used it is the same as the other tie layers in the structure.

Preferably, the multilayer structure are selected from:
PS/tie/barrier/tie/PP/tie/PE
HIPS/tie/barrier/tie/PE/tie/PP
PS/tie/barrier/tie/PE/tie/PP
HIPS/tie/barrier/tie/PP/tie/PE
PS+HIPS/tie/barrier/tie/PP/tie/PE
PS+HIPS/tie/barrier/tie/PE/tie/PP.
More preferably, the multilayer structures is PS+HIPS/tie/barrier/tie/PP/tie/PE or PS+HIPS/tie/barrier/tie/PE/tie/PP.

The following examples illustrate the invention; however, those skilled in the art will recognize numerous variations within the spirit of the invention and scope of the claims.

Adhesive compositions of the examples were prepared using the following components:

| | |
|---|---|
| LLDPE-1 | LLDPE having a density of 0.918 g/cm$^3$ and an MI of 2 dg/min. |
| LLDPE-2 | LLDPE having a density of 0.916 g/cm$^3$ and an MI of 4 dg/min. |
| Mgraft-1 | HDPE grafted with 1.9 wt % maleic anhydride, having an MI of 9.5 dg/min and a density of 0.952 g/cm$^3$. |
| EPR-1 | Ethylene-propylene copolymer containing 72 wt % ethylene and 28 wt % propylene, having an MI of 1 dg/min. |
| SBS-1 | Styrene-butadiene-styrene triblock copolymer, 43 wt % styrene, MI of 23 dg/min. |
| SBS-2 | Styrene-butadiene-styrene triblock copolymer, 44.5 wt % styrene, MI of 11.5 dg/min |
| PPgraft | Propylene copolymer grafted with 2 wt % maleic anhydride, having a MFR of 350 dg/min. |
| Plast-1 | An ethylene-octene copolymer having an ethylene content of 51 wt %, a density of 0.860 g/cm$^3$ and an MI of 1.1 dg/min. |
| Homo-1 | Propylene homopolymer having a melt flow rate (MFR) of 5 dg/min., measured according to ASTM D1238, condition 230/2.16 |
| Copol-1 | Propylene copolymer containing 3 wt % ethylene having an MFR of 1.9 dg/min. |

In Examples 1-16, the propylene homopolymer and LLDPE films in the multilayer structures contained 3.5 wt % of a 60 wt % white (TiO$_2$) concentrate. Adhesion values for Examples 1-4 and Comparative Examples 5-8 are shown in Table 1.

EXAMPLE 1

A 5-mil cast adhesive film was prepared by first melt blending in a ZSK-18 extruder an adhesive composition containing 60 wt % LLDPE-1, 10 wt % Mgraft-1, and 30 wt % SBS-1, and then extruding the blended mixture in a Killion KL-100 extruder having a temperature profile of 145° C., 155° C., 160° C. and 170° C.

The adhesive film and a 5 mil film of a propylene homopolymer having a melt flow rate of 5 dg/min were cut into 1.5"×3" coupons, and a sample arranged, where the top layer was the adhesive film and the bottom layer was the homopolymer. The bars of a Sentinel heat sealer were preheated before heat sealing, by closing the heat-sealing bars for three seconds with only the top bar heated. The sample was then heat sealed at 450° F. and 40 psig for a dwell time of three seconds. Following heat sealing, the coupons were cut into 1"×3" coupons for adhesion testing. Adhesion was determined on the heat-sealed sample by ASTM method D1876 in an Instron tensile tester, by measuring the force required to separate the layers in a T-Peel configuration at a cross head speed of 10 in/minute. Adhesion was measured at the propylene homopolymer/tie interface.

EXAMPLE 2

Example 1 was repeated except that the sample was heat sealed at 475° F. Adhesion was measured at the propylene homopolymer/tie interface.

EXAMPLE 3

Example 1 was repeated except that a linear low density polyethylene having a density of 0.918 g/cm$^3$ and an MI of 7 dg/min. was used instead of the propylene homopolymer as the layer bonded to the adhesive. Adhesion was measured at the polyethylene/tie interface.

EXAMPLE 4

Example 3 was repeated except that the sample was heat sealed at 475° F. Adhesion was measured at the polyethylene/tie interface.

COMPARATIVE EXAMPLE 5

Example 1 was repeated except that the adhesive composition was 68 wt % LLDPE-1, 12 wt % Mgraft-1, and 20 wt % EPR-1 wt %. Adhesion was measured at the propylene homopolymer/tie interface.

COMPARATIVE EXAMPLE 6

Comparative Example 5 was repeated except that the sample was heat sealed at 475° F. Adhesion was measured at the propylene homopolymer/tie interface.

COMPARATIVE EXAMPLE 7

Comparative Example 5 was repeated except that a linear low density polyethylene having a density of 0.918 g/cm$^3$ and an MI of 7 dg/min. was used instead of the propylene homopolymer as the layer bonded to the adhesive. Adhesion was measured at the polyethylene/tie interface.

COMPARATIVE EXAMPLE 8

Example 7 was repeated except that the sample was heat sealed at 475° F. Adhesion was measured at the polyethylene/tie interface.

TABLE 1

| | Adhesion, lb/in. |
|---|---|
| Ex. 1 | 1.99 |
| Ex. 2 | 1.94 |
| Ex. 3 | 7.00 |
| Ex. 4 | 7.09 |
| Comp. Ex. 5 | 0.23 |
| Comp. Ex. 6 | 0.22 |
| Comp. Ex. 7 | 6.58 |
| Comp. Ex. 8 | 6.43 |

The adhesion values obtained in Examples 1-4 demonstrate improved performance of the adhesive containing the SBS polymer with both propylene homopolymer and LLDPE layers, relative to the polyethylene-based adhesives of Comparative Examples 5-8.

Adhesion values for Examples 9-12 and Comparative Examples 13-16 are shown in Table 2.

EXAMPLE 9

A 7-mil cast adhesive film was prepared by first melt blending in a ZSK-18 extruder an adhesive composition containing 60 wt % LLDPE-1, 10 wt % Mgraft-1, and 30 wt % SBS-1, and then extruding the blended mixture in a Killion KL-100 extruder having a temperature profile of 145° C., 155° C., 160° C. and 170° C.

The adhesive film and a 7 mil film of a propylene homopolymer having a melt flow rate of 5 dg/min were cut into 1.5"×3" coupons, and a sample arranged, where the top layer was the adhesive film and the bottom layer was the homopolymer. The bars of a Sentinel heat sealer were preheated before heat sealing, by closing the heat-sealing bars for three seconds with only the top bar heated. The sample was then heat sealed at 450° F. and 40 psig for a dwell time of three seconds. Following heat sealing, the coupons were cut into 1"×3" coupons for adhesion testing. Adhesion was determined on the heat-sealed sample by ASTM method D1876 in an Instron tensile tester, by measuring the force required to separate the layers in a T-Peel configuration at a cross head speed of 10 in/minute. Adhesion was measured at the propylene homopolymer/tie interface.

EXAMPLE 10

Example 9 was repeated except that the sample was heat sealed at 475° F. Adhesion was measured at the propylene homopolymer/tie interface.

EXAMPLE 11

Example 9 was repeated except that a linear low density polyethylene having a density of 0.918 and an MI of 7 was used instead of the propylene homopolymer as the layer bonded to the adhesive. Adhesion was measured at the polyethylene/tie interface.

EXAMPLE 12

Example 11 was repeated except that the sample was heat sealed at 475° F. Adhesion was measured at the polyethylene/tie interface.

COMPARATIVE EXAMPLE 13

Example 9 was repeated except that the adhesive composition was 68 wt % LLDPE-1, 12 wt % Mgraft-1, and 20 wt % EPR-1 wt %. Adhesion was measured at the propylene homopolymer/tie interface.

COMPARATIVE EXAMPLE 14

Comparative Example 13 was repeated except that the sample was heat sealed at 475° F. Adhesion was measured at the propylene homopolymer/tie interface.

COMPARATIVE EXAMPLE 15

Comparative Example 13 was repeated except that a linear low density polyethylene having a density of 0.918 and an MI of 7 was used instead of the propylene homopolymer as the layer bonded to the adhesive. Adhesion was measured at the polyethylene/tie interface.

COMPARATIVE EXAMPLE 16

Comparative Example 15 was repeated except that the sample was heat sealed at 475° F. Adhesion was measured at the polyethylene/tie interface.

TABLE 2

|  | Adhesion, lb/in. |
| --- | --- |
| Ex. 9 | 2.43 |
| Ex. 10 | 2.94 |
| Ex. 11 | 7.49 |
| Ex. 12 | 7.04 |
| Comp. Ex. 13 | 0.39 |
| Comp. Ex. 14 | 0.29 |
| Comp. Ex. 15 | 6.43 |
| Comp. Ex. 16 | 6.45 |

The adhesion values obtained in Examples 9-12 demonstrate improved performance of the adhesive containing the SBS polymer with both propylene homopolymer and LLDPE layers, relative to the polyethylene-based adhesives of Comparative Examples 13-16.

Adhesion values for Examples 17-22 and Comparative Examples 23-31 are shown in Table 3.

EXAMPLE 17

Example 1 was repeated except that the sample was heat sealed at 400° F. and no white ($TiO_2$) concentrate was used. Adhesion was measured at the propylene homopolymer/tie interface.

EXAMPLE 18

Example 17 was repeated except that the sample was heat sealed at 450° F. Adhesion was measured at the propylene homopolymer/tie interface.

EXAMPLE 19

Example 17 was repeated except that the sample was heat sealed at 500° F. Adhesion was measured at the propylene homopolymer/tie interface.

EXAMPLE 20

Example 3 was repeated except that the sample was heat sealed at 400° F. and no white ($TiO_2$) concentrate was used. Adhesion was measured at the polyethylene/tie interface.

EXAMPLE 21

Example 20 was repeated except that the sample was heat sealed at 450° F. Adhesion was measured at the polyethylene/tie interface

EXAMPLE 22

Example 20 was repeated except that the sample was heat sealed at 500° F. Adhesion was measured at the polyethylene/tie interface.

COMPARATIVE EXAMPLE 23

Example 3 was repeated except that the sample was heat sealed at 400° F., no white ($TiO_2$) concentrate was used, and the adhesive composition was 79 wt % Homo-1, 15 wt % Plast-1 and 6 wt % PPgraft. Adhesion was measured at the polyethylene/tie interface.

COMPARATIVE EXAMPLE 24

Comparative Example 23 was repeated except that the sample was heat sealed at 450° F. Adhesion was measured at the polyethylene/tie interface.

COMPARATIVE EXAMPLE 25

Comparative Example 23 was repeated except that the sample was heat sealed at 500° F. Adhesion was measured at the polyethylene/tie interface.

COMPARATIVE EXAMPLE 26

Comparative Example 23 was repeated except that the adhesive composition was 75 wt % Copol-1, 10 wt % PPgraft, and 15 wt % EPR. Adhesion was measured at the polyethylene/tie interface.

COMPARATIVE EXAMPLE 27

Comparative Example 26 was repeated except that the sample was heat sealed at 450° F. Adhesion was measured at the polyethylene/tie interface.

COMPARATIVE EXAMPLE 28

Comparative Example 26 was repeated except that the sample was heat sealed at 500° F. Adhesion was measured at the polyethylene/tie interface.

COMPARATIVE EXAMPLE 29

Comparative Example 23 was repeated except that the adhesive composition was 65 wt % Copol-1, 15 wt % PPgraft and 20 wt % EPR. Adhesion was measured at the polyethylene/tie interface.

COMPARATIVE EXAMPLE 30

Comparative Example 29 was repeated except that the sample was heat sealed at 450° F. Adhesion was measured at the polyethylene/tie interface.

COMPARATIVE EXAMPLE 31

Comparative Example 29 was repeated except that the sample was heat sealed at 500° F. Adhesion was measured at the polyethylene/tie interface.

TABLE 3

| | Adhesion, lb/in. |
|---|---|
| Ex. 17 | 1.92 |
| Ex. 18 | 4.31 |
| Ex. 19 | 3.51 |
| Ex. 20 | 5.26 |
| Ex. 21 | 6.24 |
| Ex. 22 | 5.72 |
| Comp. Ex. 23 | <0.05 |
| Comp. Ex. 24 | <0.05 |
| Comp. Ex. 25 | 0.1 |
| Comp. Ex. 26 | 0.15 |
| Comp. Ex. 27 | 0.2 |
| Comp. Ex. 28 | 0.43 |
| Comp. Ex. 29 | 0.25 |
| Comp. Ex. 30 | 0.3 |
| Comp. Ex. 31 | 0.5 |

The adhesion values obtained in Examples 17-22 demonstrate improved performance of the adhesive containing the SBS polymer with the LLDPE layer while also having good adhesion to propylene homopolymer layer, relative to the various propylene-based adhesives of Comparative Examples 23-31.

EXAMPLE 32

A five-layer coextruded cast sheet having a thickness of 18 mils were prepared on a Killion extruder with an A (43%)/B (3%)/C (8%)/B (3%)/E (43%) structure where skin layer A was the LLDPE layer of Example 3, layer B was the adhesive layer of Example 1, barrier layer C was EVOH (Soarnol DC3203FB grade), and skin layer E was the propylene homopolymer of Example 1.

Adhesion was determined by standard ASTM method D1876 by cutting 25.4 mm wide strips in the machine direction near the center of the coextruded film. Each strip was separated at the tie/LLDPE interface. The force required to separate the film apart in a T-Peel configuration at 254 (10") mm/min was measured using an Instron tensile tester. The average adhesion of five specimens was 6.74 lb/in.

EXAMPLE 33

Example 32 was repeated excepted that each strip was separated at the tie/homopolymer interface. The adhesion was 3.25 lb/in.

COMPARATIVE EXAMPLE 34

Example 32 was repeated except that the adhesive of Comparative Example 5 was used. Adhesion at the tie/propylene homopolymer interface was less than 0.1 lb/in.

Example 33 demonstrates the superior performance of the inventive structure having an adhesive containing the SBS polymer with propylene homopolymer layers, relative to Comparative Example 34, while also having good performance with the LLDPE layer.

EXAMPLE 35

A five-layer coextruded cast sheet having a thickness of 24 mils was prepared on a Killion extruder with an A (43%)/B (3%)/C (8%)/B (3%)/A (43%) structure where skin layers A were a 50/50 blend of polystyrene and HIPS having an MI of 8 dg/min and containing 8% rubber, layer B was the adhesive layer of Example 1, and barrier layer C was as in Example 32.

Adhesion was determined as in Example 32, except that the strips were separated at the tie/PS+HIPS interface. The average adhesion of five specimens was 12.6 lb/in.

COMPARATIVE EXAMPLE 36

A five-layer coextruded cast sheet was prepared as in Example 35 except that adhesive layer B contained 57 wt % LLDPE-2, 25 wt % SBS-2, 12 wt % Mgraft-1, and 6 wt % Plast-1 was used. The adhesion at the tie/PS+HIPS interface was less than 0.1 lb/in.

Example 35 and Comparative Example 36 demonstrate the superior performance of the adhesive containing the higher MI SBS polymer with the PS+HIPS layer relative to the adhesive containing the lower MI SBS polymer.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

I claim:
1. A multilayer structure comprising:
   a. a propylene polymer layer;
   b. a styrene polymer layer;
   c. a polyethylene layer; and
   d. tie layers comprising:
      (1) 25 to 75 wt % of an ethylene-$C_{4-8}$ α-olefin linear low density copolymer;

(2) 5 to 25 wt % of a polyethylene resin grafted with an ethylenically unsaturated carboxylic acid or acid derivative; and (3) 20 to 50 wt % of a styrene-butadiene-styrene triblock copolymer having an MI of 18 to 35 dg/min., wherein the tie layers are the same and are positioned between adjacent layers of a-c.

2. The multilayer structure of claim 1 further comprising a barrier layer selected from EVOH, polyamides, co-extruded structures of EVOH and polyamides, polyvinylidene chloride, or polychlorotrifluoroethylene.

3. The multilayer structure of claim 2 wherein the barrier layer is selected from EVOH, polyamides or co-extruded structures of EVOH and polyamides.

4. The multilayer structure of claim 3 wherein the barrier layer is EVOH.

5. The multilayer structure of claim 3 wherein the polyamides are selected from nylon 6, nylon 6,6, nylon 12, nylon 6,12, nylon 6,66 or mixtures thereof.

6. The multilayer structure of claim 2 wherein the co-extruded structures of EVOH and polyamides are selected from polyamide/EVOH/polyamide or EVOH/polyamide.

7. The multilayer structure of claim 1 wherein the styrene polymer layer is a blend of polystyrene and high impact polystyrene.

8. The multilayer structure of claim 1 wherein the MI of the styrene-butadiene-styrene triblock copolymer is 20 to 30 dg/min.

9. The multilayer structure of claim 1 selected from PS/tie/barrier/tie/PP/tie/PE, HIPS/tie/barrier/tie/PE/tie/PP, PS/tie/barrier/tie/PE/tie/PP, HIPS/tie/barrier/tie/PP/tie/PE, PS+HIPS/tie/barrier/tie/PP/tie/PE or PS+HIPS/tie/barrier/tie/PE/tie/PP.

10. The multilayer structure of claim 9 selected from PS+HIPS/tie/barrier/tie/PP/tie/PE or PS+HIPS/tie/barrier/tie/PE/tie/PP.

11. A process comprising co-extruding a multilayer structure, the multilayer structure comprising:

a. a propylene polymer layer;

b. a styrene polymer layer;

c. a layer selected from polyethylene or co-extruded structures of polyethylene and ethylene-vinyl acetate copolymer; and d. tie layers comprising:

(1) 25 to 75 wt % of an ethylene-$C_{4-8}$ $\alpha$-olefin linear low density copolymer;

(2) 5 to 25 wt % of a polyethylene resin grafted with an ethylenically unsaturated carboxylic acid or acid derivative; and (3) 20 to 50 wt % of a styrene-butadiene-styrene triblock copolymer having an MI of 18 to 35 dg/min., wherein the tie layers are the same and are positioned between adjacent layers of a-c.

12. The process of claim 11 further comprising a barrier layer selected from EVOH, polyamides, co-extruded structures of EVOH and polyamides, polyvinylidene chloride, or polychlorotrifluoroethylene.

13. The process of claim 11 wherein the MI of the styrene-butadiene-styrene triblock copolymer is 20 to 30 dg/min.

14. The process of claim 11 wherein the styrene polymer layer is a blend of polystryrene and high impact polystyrene.

15. The process of claim 12 wherein the barrier layer is selected from EVOH, polyamides or co-extruded structures of EVOH and polyamides.

* * * * *